United States Patent
Lee et al.

(10) Patent No.: US 8,339,815 B2
(45) Date of Patent: Dec. 25, 2012

(54) FREQUENCY MODULATION CONTROLLER, SWITCH MODE POWER SUPPLY INCLUDING THE SAME, AND SWITCHING OPERATION FREQUENCY MODULATION METHOD

(75) Inventors: Kwang-Il Lee, Gyeonggi-do (KR); Jin-Tae Kim, Seoul (KR); Gwan-Bon Koo, Gyeonggi-do (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 267 days.

(21) Appl. No.: 12/788,144

(22) Filed: May 26, 2010

(65) Prior Publication Data

US 2010/0321962 A1    Dec. 23, 2010

(30) Foreign Application Priority Data

Jun. 18, 2009 (KR) .................. 10-2009-0054594

(51) Int. Cl.
*H02M 3/335* (2006.01)
(52) U.S. Cl. ...................... 363/21.15; 363/97
(58) Field of Classification Search .............. 363/20, 363/21.01, 21.07, 21.1, 21.11, 21.12, 21.15, 363/21.18, 97; 323/285, 299
See application file for complete search history.

(56) References Cited

U.S. PATENT DOCUMENTS

| | | | |
|---|---|---|---|
| 5,668,464 A * | 9/1997 | Krein et al. | 323/259 |
| 5,767,752 A | 6/1998 | Yeon | |
| 6,107,851 A | 8/2000 | Balakirshnan et al. | |
| 6,115,274 A * | 9/2000 | Mao | 363/89 |
| 6,760,238 B2 * | 7/2004 | Charych | 363/97 |
| 7,994,736 B2 * | 8/2011 | Usui et al. | 315/307 |
| 2005/0157522 A1 | 7/2005 | Osaka | |

FOREIGN PATENT DOCUMENTS

JP    2006-149152    8/2006

* cited by examiner

*Primary Examiner* — Gary L Laxton
(74) *Attorney, Agent, or Firm* — Okamoto & Benedicto LLP

(57) ABSTRACT

Ripple of an input voltage is used to modulate a switching operation frequency of a switch mode power supply. A sensing voltage corresponding to the input voltage is received, a current ripple that is proportional to a difference between a peak value of the sensing voltage and the sensing voltage is generated, and a modulation control signal that is variable by the current ripple is generated. A switching frequency is modulated using an oscillator signal that is variable by the modulation control signal, and reduces the output voltage ripple.

18 Claims, 8 Drawing Sheets

FREQUENCY MODULATION CONTROLLER, SWITCH MODE POWER SUPPLY INCLUDING THE SAME, AND SWITCHING OPERATION FREQUENCY MODULATION METHOD

CROSS-REFERENCE TO RELATED APPLICATION

This application claims priority to and the benefit of Korean Patent Application No. 10-2009-0054594 filed in the Korean Intellectual Property Office on Jun. 18, 2009, the entire contents of which are incorporated herein by reference.

BACKGROUND OF THE INVENTION (a) Field of the Invention

The present invention relates to a switching operation frequency modulation device for reducing an output voltage ripple, and a switch mode power supply (SMPS).

(b) Description of the Related Art

An SMPS rectifies an input AC voltage into an input DC voltage, and converts the input DC voltage into a DC output voltage of another level. Such SMPS is mainly used for battery power supply devices such as power electronic devices, particularly, mobile phones and laptop computers.

An output voltage of the SMPS is increased/decreased by an increase/decrease of an input DC voltage (hereinafter, input voltage). That is, a ripple of the input voltage influences the output voltage of the SMPS, and an output voltage ripple in which the output voltage is increased/decreased by the input voltage is generated.

Switching noise that is generated by a switching operation when the SMPS is operated can cause electromagnetic interference (EMI) generation in equipment including the SMPS. Switching noise represents a noise component that occurs by a switching operation frequency of a switch configuring the SMPS and a harmonics component. When the EMI occurs, operations of peripheral electronic devices of the device including the SMPS are jammed. A method for suppressing occurrence of EMI is a method for modulating the switching operation frequency. However, the frequency modulation method generates an output voltage ripple according to switching operation frequency modulation, which is added to an output voltage ripple component by the input voltage's ripple to generate a greater output voltage ripple.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a frequency modulation control device for preventing EMI from an SMPS and reducing an output voltage ripple, a switch mode power supply including the same, and a switching operation frequency modulation method.

An exemplary embodiment of the present invention provides a frequency modulation control device for controlling switching operation frequency modulation of a switch mode power supply (SMPS), including: a peak detector for receiving a sensing voltage corresponding to an input voltage generated by rectifying an input AC voltage of the SMPS, and detecting and maintaining a peak value of the sensing voltage; a ripple generator for generating a current ripple that is proportional to a difference between the peak value and the sensing voltage; and a modulation control signal generator for generating a modulation control signal by using current generated by subtracting the current ripple from a predetermined reference current.

The ripple generator includes: a first comparator for generating a differential voltage corresponding to a difference between the peak value and the sensing voltage; a controller for selecting a predetermined gain according to the differential voltage, and generating a ripple control signal by multiplying the gain by the differential voltage; and a current converter for generating the current ripple according to the ripple control signal.

The current converter includes: a transistor; a resistor connected between an emitter electrode of the transistor and ground; and a second comparator for controlling a current ripple flowing to the transistor by using the ripple control signal and the resistor.

When the amplitude of the differential voltage is less than a predetermined reference amplitude, the gain is set according to the differential voltage to control the amplitude of the ripple control signal to be the reference amplitude, or the gain is set according to the differential voltage so that the amplitude of the ripple control signal may be a predetermined reference amplitude, and the amplitude of the ripple control signal is maintained.

The modulation control signal generator includes: a reference current source for supplying the reference current; a add-drop unit for generating current generated by adding the current ripple to the reference current or dropping the current ripple from the reference current; and a dependent current source for receiving the current generated by the add-drop unit, and generating a modulation control signal corresponding to the current.

Another embodiment of the present invention provides a switch mode power supply (SMPS) including: a power switch; a transformer for transmitting power of a primary coil to a secondary coil according to a switching operation of the power switch; a feedback circuit connected to the secondary coil of the transformer for generating feedback information corresponding to a voltage at the secondary coil; and a switch controller for controlling a switching operation of the power switch by using the feedback information and a ripple of an input voltage transmitted to the primary coil of the transformer, and modulating a switching operation frequency.

The switch controller includes a frequency modulation control device for comparing a feedback voltage corresponding to the feedback information and an oscillator signal for controlling the switching operation frequency, turning the power switch on or off according to the comparison result, and modulating a frequency of the oscillator signal by using a ripple of the input voltage.

The frequency modulation control device includes: a peak detector for receiving a sensing voltage corresponding to the input voltage, and sensing and maintaining a peak value of the sensing voltage; a ripple generator for generating a current ripple that is proportional to a difference between the peak value and the sensing voltage; and a modulation control signal generator for generating a modulation control signal by using a current generated by subtracting the current ripple from a predetermined reference current, wherein the frequency of the oscillator signal is increased/decreased according to the modulation control signal.

The ripple generator includes: a first comparator for generating a differential voltage corresponding to a difference between the peak value and the sensing voltage; a controller for selecting a predetermined gain according to the differential voltage, and generating a ripple control signal by multiplying the differential voltage by the gain; and a current converter for generating the current ripple according to the ripple control signal.

The current converter includes: a transistor; a resistor connected between an emitter electrode of the transistor and the ground; and a second comparator for controlling a current ripple flowing to the transistor by using the ripple control signal and the resistor.

The gain is set according to the differential voltage to control amplitude of the ripple control signal to be the reference amplitude when the amplitude of the differential voltage is less than a predetermined reference amplitude, or the gain is set according to the differential voltage to control the amplitude of the ripple control signal to be a predetermined reference amplitude, and the amplitude of the ripple control signal is maintained.

The modulation control signal generator includes: a reference current source for supplying the reference current; a add-drop unit for generating current generated by adding the current ripple to the reference current or dropping the current ripple from the reference current; and a dependent current source for receiving the generated current from the add-drop unit, and generating a modulation control signal corresponding to the current.

Yet another embodiment of the present invention provides a method for modulating a switching operation frequency of a switch mode power supply (SMPS), including: receiving a sensing voltage corresponding to an input voltage generated by rectifying an input AC voltage of the SMPS, and sensing and maintaining a peak value of the sensing voltage; generating a current ripple that is proportional to a difference between the peak value and the sensing voltage; generating a modulation control signal by using current generated by subtracting the current ripple from a predetermined reference current; generating an oscillator signal having a frequency that is increased/decreased according to the modulation control signal; and controlling a switching operation of a power switch of the SMPS according to the oscillator signal.

The generating of a current ripple includes: generating a differential voltage corresponding to a difference between the peak value and the sensing voltage; selecting a predetermined gain according to the differential voltage, and generating a ripple control signal by multiplying the differential voltage by the gain; and generating the current ripple according to the ripple control signal. The gain is set according to the differential voltage to control the amplitude of the ripple control signal to be the reference amplitude when the amplitude of the differential voltage is less than a predetermined reference amplitude, or the gain is set according to the differential voltage to control the amplitude of the ripple control signal to be a predetermined reference amplitude, and the amplitude of the ripple control signal is maintained.

According to an embodiment of the present invention, a frequency modulation control device for preventing generation of EMI from an SMPS and reducing an output voltage ripple, a switch mode power supply including the same, and a switching operation frequency modulation method are provided.

DETAILED DESCRIPTION OF THE EMBODIMENTS

Figure 1:
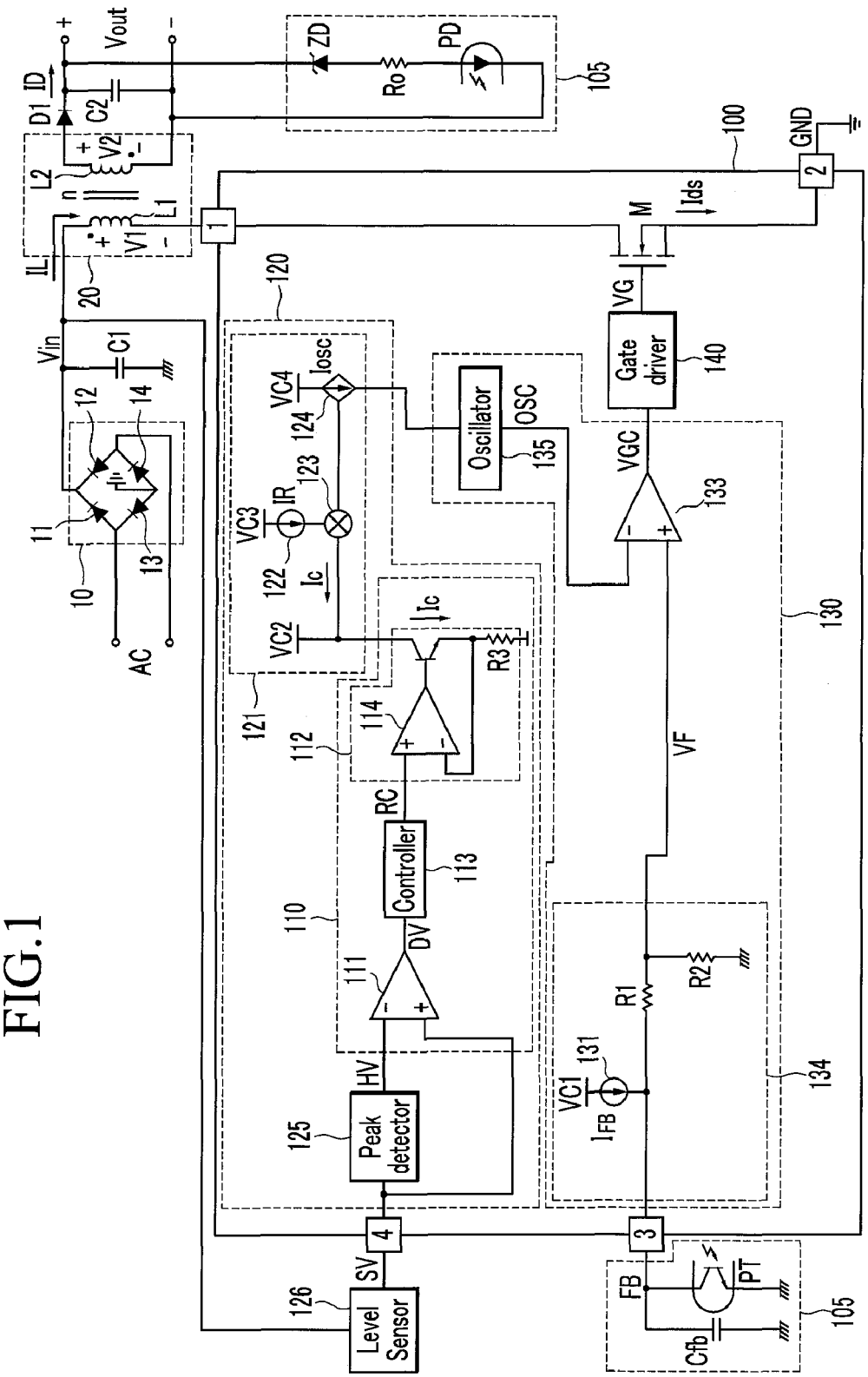
FIG. 1 shows an SMPS including a frequency modulation control device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A frequency modulation control device according to an exemplary embodiment of the present invention and an SMPS using the same will now be described with reference to accompanying drawings.

FIG. 1 shows an SMPS including a frequency modulation control device according to an exemplary embodiment of the present invention.

As shown in FIG. 1, the SMPS includes a bridge diode 10, a transformer 20, a feedback circuit 105, and a switch controller 100.

In the exemplary embodiment of the present invention, the switch controller 100 includes a power switch (M), but the present invention is not restricted thereto. The power switch (M) and the switch controller 100 can be separated and realized as individual chips. The power switch (M) is an n-channel type of transistor, and a source electrode of the power switch (M) is grounded through a connecting terminal 2.

The bridge diode 10 includes 4 diodes 11-14, and generates an input voltage (Vin) by full-wave rectifying input AC (AC). The capacitor C1 smoothes an input voltage (Vin) to supply the smoothed input voltage (Vin) to the transformer 20. The smoothed input voltage (Vin) will be referred to as an input voltage (Vin) hereinafter. The input voltage (Vin) is transmitted to the switch controller 100 through the level sensor 126.

The transformer 20 transmits power of a primary coil to a secondary coil according to a switching operation of the power switch (M). The transformer 20 includes the primary coil L1 and the secondary coil L2. An input voltage (Vin) is supplied to a first end of the primary coil L1, and a second end of the primary coil L1 is connected to a drain electrode of the power switch (M) through a connecting terminal 1. A first end of the secondary coil L2 is connected to an anode of the diode D1, a second end thereof is connected to a first end of the capacitor C2, and a second end of the capacitor C2 is connected to a cathode of the diode D1. A voltage at the capacitor C2 is an output voltage (Vout). A turn ratio (n) is acquired by dividing the number of turns of the primary coil L1 by the number of turns of the secondary coil L2. The voltage V2 is a voltage that is generated by dividing the voltage V1 by the turn ratio, and the polarity of the voltage V2 is opposite to that of the voltage V1.

When the power switch (M) is turned on, the voltage V1 at the primary coil L1 becomes the input voltage (Vin) and the current (IL) flowing to the primary coil L1 is increased. The current (IL) is increased with a slope that is proportional to the input voltage (Vin). The drain current (Ids) is the same as the current (IL) while the power switch (M) is turned on.

When the power switch (M) is turned off, the voltage (V1) at the primary coil L1 becomes the negative voltage that the voltage (V2) multiplied by the turn ratio (n) is. When the power switch (M) is turned off, the voltage (V2) becomes positive. The current (IL) is reduced with a slope that is proportional to the output voltage (Vout). In this instance, the diode D1 is turned on to generate a current (ID) flowing through the secondary coil L2. The current (ID) charges the capacitor C2 or flows to a load connected to the SMPS. The capacitor C2 is charged by the current (ID), and supplies needed power to the load when the diode D1 is turned off.

The feedback circuit 105 includes a Zener diode (ZD), a resistor (Ro), a photodiode (PD), a phototransistor (PT), and a feedback capacitor (Cfb). The feedback circuit 105 generates feedback information (FB) corresponding to the output voltage (Vout), and transmits the same to the switch controller 100. The output voltage (Vout) is applied to a cathode of the Zener diode (ZD), and an anode is connected to a first end of the resistor (Ro). A second end of the resistor (Ro) is connected to a first end of the photodiode (PD). When a cathode voltage is greater than an anode voltage by more than a breakdown voltage, the Zener diode (ZD) is turned on to apply current, and a voltage difference between the cathode and the anode of the Zener diode (ZD) is maintained at the breakdown voltage. When the Zener diode (ZD) is turned on by the output voltage (Vout), the current corresponding to the output voltage (Vout) flows through the Zener diode (ZD), the resistor (Ro), and the photodiode (PD). The photodiode (PD) outputs light according to the flowing current. The current corresponding to the brightness of the photodiode (PD) flows to the phototransistor (PT) formed by the photodiode (PD) and the photocoupler. As the current is applied to the phototransistor (PT), the feedback capacitor (Cfb) is discharged and the voltage at the feedback signal (FB) is reduced. On the contrary, as the current of the phototransistor (PT) is reduced, the current supplied to the feedback capacitor (Cfb) is increased to increase the voltage at the feedback signal (FB). Therefore, as the load is increased, the output voltage (Vout) is reduced, the current of the phototransistor (PT) is reduced, and the voltage at the feedback signal (FB) is increased. As the load is decreased, the output voltage (Vout) is increased to increase the current of the phototransistor (PT) and reduce the voltage at the feedback signal (FB).

The switch controller 100 compares the feedback information (FB) and the oscillator signal (OSC) to turn on/off states of the control power switch (M), and uses a ripple of the input voltage (Vin) to modulate the switching operation frequency of the power switch (M). The switch controller 100 modulates the frequency of the oscillator signal (OSC) according to the modulation control signal (Iosc) provided by the frequency modulation control device 120. Since the switching operation frequency of the SMPS according to an exemplary embodiment of the present invention is determined by the oscillator signal (OSC), the SMPS varies the switching operation frequency according to the ripple of the input voltage (Vin).

A configuration of the switch controller 100 will now be described. The switch controller 100 includes a frequency modulation device 120, a PWM controller 130, and a gate driver 140.

The frequency modulation control device 120 receives a voltage corresponding to the input voltage (Vin), senses the ripple of the input voltage (Vin), and modulates the frequency of the oscillator signal (OSC) according to the sensed ripple. In detail, the frequency modulation device 120 receives a sensing voltage (SV) from the level sensor 126, generates ripple information of the input voltage (Vin) from the sensing voltage (SV), and generates a modulation control signal by using the ripple information.

The frequency modulation control device 120 includes a modulation control signal generator 121, a ripple generator 110, and a peak detector 125. The level sensor 126 of the frequency modulation control device 120 is illustrated to be provided outside the switching controller 100, but the present invention is not restricted thereto and the level sensor 126 can be included in the frequency modulation control device 120. Also, the frequency modulation control device 120 is described to be included in the switch controller 100, but the present invention is not restricted thereto, and the frequency modulation control device 120 can be provided outside the switch controller 100 to transmit the modulation control signal (Iosc) to the switch controller 100.

The peak detector 125 samples a peak value (HV) of the sensing voltage (SV), holds the sampled peak value (HV), and transmits it to the ripple generator 110. The peak value (HV) is maintained as long as the peak value of the sensing voltage (SV) is not varied. The peak value (HV) is carried according to variation of the peak value of the sensing voltage (SV). The difference between the peak value (HV) and the sensing voltage (SV) is a voltage corresponding to the ripple of the input voltage (Vin), and it will be called an input ripple voltage hereinafter.

The ripple generator 110 generates a current ripple (Ic) that is proportional to the difference between the received peak value (HV) and the sensing voltage (SV). The ripple generator 110 includes a comparator 111, a controller 113, and a current converter 112.

The comparator 111 generates a differential voltage (DV) by subtracting a sensing voltage (SV) input to an inverting terminal (−) from the peak value (HV) input to the non-inverting terminal (+).

The controller 113 selects an appropriate gain according to the differential voltage (DV), and generates a ripple control signal (RC) by multiplying the selected gain by the differential voltage (DV). The controller 113 controls the gain according to the differential voltage (DV) to allow the ripple control signal (RC) to have a predetermined reference amplitude, which will be described later with reference to FIG. 3 to FIG. 6.

The current converter 112 generates a current ripple (Ic) according to a ripple control signal (RC). The current converter 112 includes a comparator 114, a transistor Q, and a resistor R3. The comparator 114 includes a buffer for the controller 113 to generate a ripple control signal (RC) without influence by an external circuit. In detail, the comparator 114 operates to control the voltage of the ripple control signal (RC) input to the non-inverting terminal (+) to correspond to the voltage at the inverting terminal (−), and transmits the ripple control signal (RC) to the emitter of the transistor (Q) without influence by the resistor R3. The current ripple (Ic) is determined by the ripple control signal (RC) and the resistor R3. The current ripple (Ic) flows from the collector electrode of the transistor (Q) to the emitter electrode. The voltage VC2 is applied to the collector electrode of the transistor (Q) and is used to generate the current ripple (Ic).

The modulation control signal generator 121 uses the current ripple (Ic) to generate a modulation control signal (Iosc) that is increased/decreased according to the current ripple (Ic). In detail, the modulation control signal generator 121 generates a modulation control signal (Iosc) by using the current that is generated by subtracting the current ripple (Ic) from the predetermined reference current. Then, the modulation control signal (Iosc) is variable by the input ripple voltage, and variation of the modulation control signal (Iosc) is proportional to variation of the input ripple voltage. Since the frequency of the oscillator signal (OSC) is determined by the modulation control signal (Iosc), the frequency of the oscillator signal (OSC) is modulated according to variation of the modulation control signal (Iosc). Since the switching operation frequency is varied according to the frequency of the oscillator signal (OSC), it is determined according to the input voltage's ripple whether to modulate the switching operation frequency.

The modulation control signal generator 121 includes a reference current source 122 for supplying reference current (IR), a add-drop unit 123 for dropping the current ripple (Ic) from the reference current (IR) and outputting the dropping result, and a dependent current source 124 for receiving the subtraction result from the add-drop unit 123. The reference current source 122 generates the reference current (IR) by using a voltage VC3, and the dependent current source 124 uses a voltage VC4 to generate the modulation control signal (Iosc) corresponding to the current provided by the add-drop unit 123. The dependent current source 124 converts the current provided by the add-drop unit 123 into a current that is appropriate for an oscillator 135 to generate a modulation control signal (Iosc). In an exemplary embodiment of the present invention, the dependent current source 124 is set to generate a current that is the same as that provided by the add-drop unit 123. FIG. 2A to FIG. 2G respectively show an input voltage (Vin), a sensing voltage (SV), a peak value (HV), a differential voltage (DV), a current ripple (Ic), a modulation control signal (Iosc), and a frequency (fs) of an oscillator signal (OSC) for describing an operation of a frequency modulation control device 120.

Figure 2A:
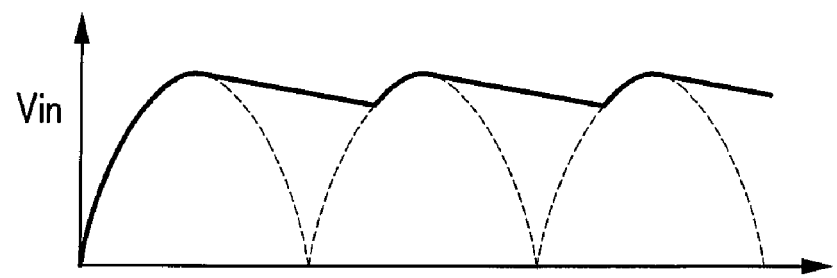
FIG. 2A to FIG. 2G respectively show an input voltage, a sensing voltage, a peak value, a differential voltage, a current ripple, a modulation control signal, and a frequency of an oscillator signal for describing an operation of a frequency modulation control device.
Figure 2B:
Figure 2C:
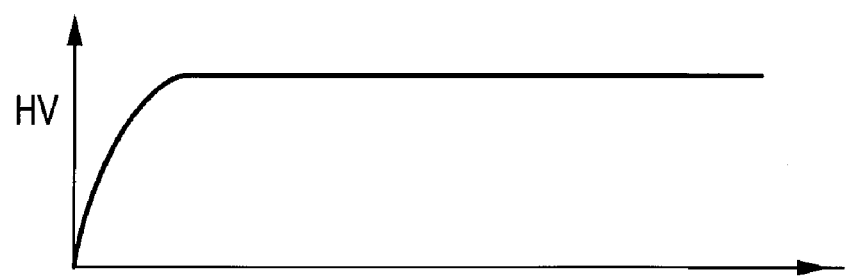
Figure 2D:
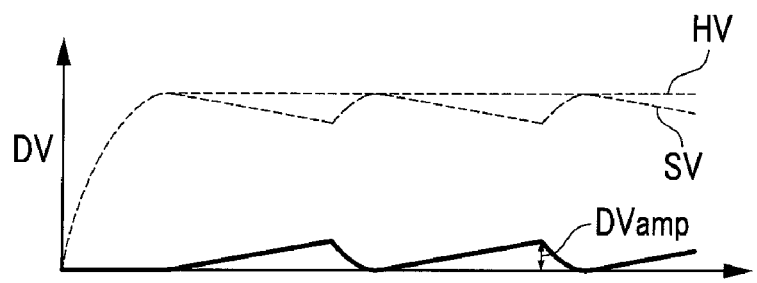
Figure 2E:
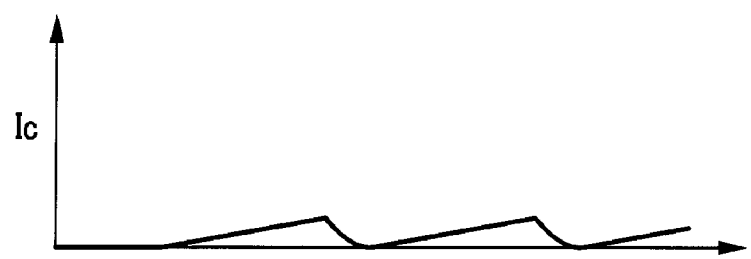
Figure 2F:
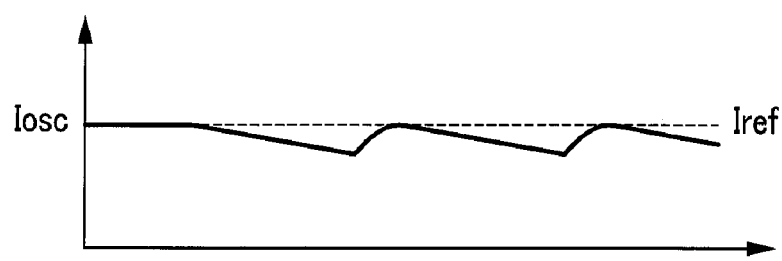
Figure 2G:
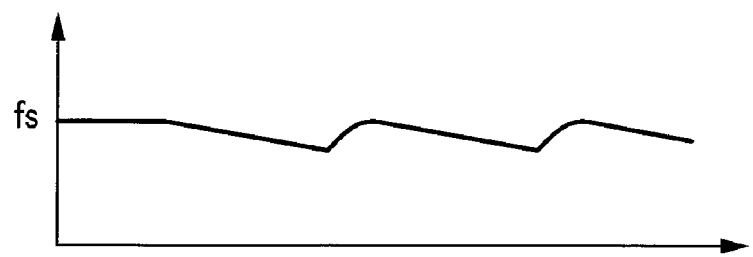

As shown in FIG. 2A, the input voltage (Vin) includes a ripple. The part shown by the dotted line in FIG. 2A indicates a voltage waveform after the input AC voltage is full-wave rectified by the bridge diode 10. The sensing voltage (SV) is generated by lowering the input voltage (Vin) to an appropriate level by the level sensor, and it has the same waveform as the input voltage (Vin). As shown in FIG. 2B, the sensing voltage (SV) has the same waveform as the input voltage (Vin). As shown in FIG. 2C, the peak value (HV) is maintained since the peak value of the sensing voltage (SV) is not changed. When the peak value of the input voltage (Vin) is changed, the peak value (HV) of the sensing voltage (SV) is changed according to the peak value of the input voltage (Vin). The two dotted lines shown in FIG. 2D show the peak value (HV) and the sensing voltage (SV) shown in FIG. 2B and FIG. 2C, wherein the difference between the two dotted lines is the differential voltage (DV) and the differential voltage (DV) is shown by the solid line in FIG. 2D. The difference between the peak value and the bottom value of the differential voltage (DV) is the amplitude (DVamp) of the differential voltage (DV). The current ripple (Ic) shown in FIG. 2E has the same waveform as the differential voltage (DV). As shown in FIG. 2F, a modulation control signal (Iosc) is generated by subtracting the current ripple (Ic) from the reference current (Iref). As shown in FIG. 2G, the oscillator 135 varies the frequency (fs) of the oscillator signal (OSC) according to the modulation control signal (Iosc).

Accordingly, EMI can be prevented by generating a modulation control signal (Iosc) according to the ripple of the input voltage (Vin) and modulating the switching operation frequency.

It has been described in the exemplary embodiment of the present invention that the add-drop unit 123 drops the current ripple (Ic) from the reference current (IR), but the present invention is not limited thereto. Differing from the exemplary embodiment, the add-drop unit 123 can add the current ripple (Ic) to the reference current (IR) and generates the modulation control signal (Iosc). The difference of schemes is generated because of the difference of methods for varying the oscillator signal according to the modulation control signal (Iosc).

In detail, the method for changing the oscillator signal's frequency includes a first method for changing the oscillator signal's slope and a second method for changing the oscillator signal's increase time. In the first method, the oscillator signal's peak value is constantly fixed, and in the second method, the slope of the oscillator signal is constantly fixed. The exemplary embodiment of the present invention has used the first method.

Figure 3A:
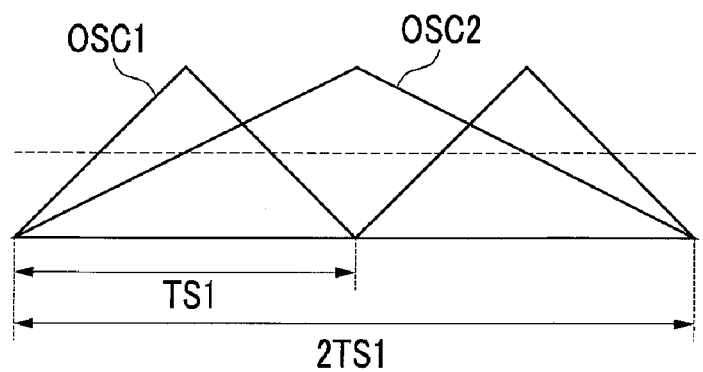
FIG. 3A shows a case in which the slope of an oscillator signal is reduced to reduce the frequency to be ½ and to double the period.
Figure 3B:
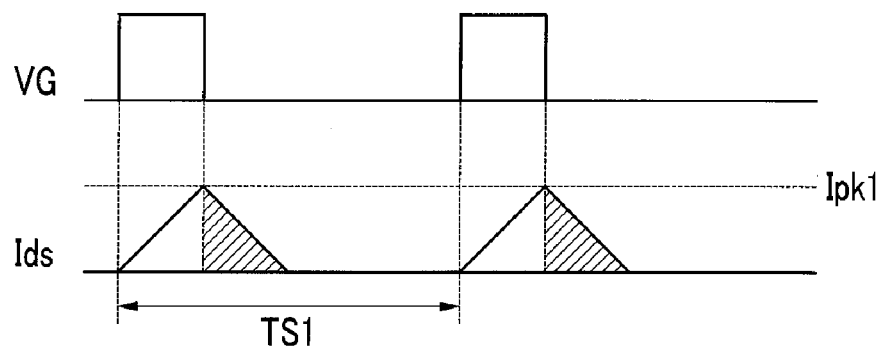
FIG. 3B shows a drain current flowing to a gate signal and a power switch according to the oscillator signal shown in FIG. 3A.
Figure 3C:
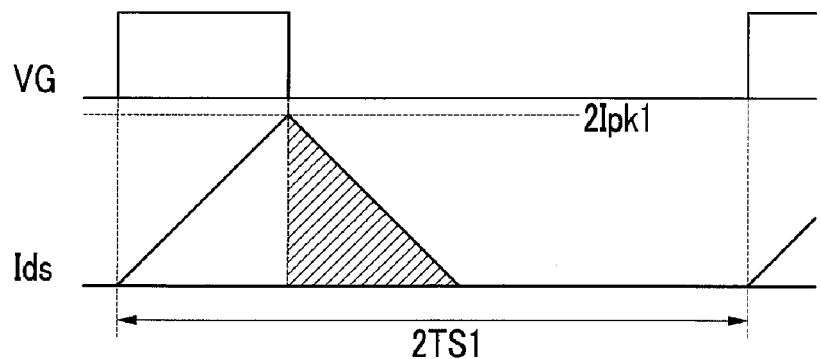
FIG. 3C shows a drain current flowing to a gate signal and a power switch according to an oscillator signal shown in FIG. 3A.

FIG. 3A shows the case in which the frequency is reduced by 1 and the period is increased since the slope of the oscillator signal is reduced according to the first method. FIG. 3B and FIG. 3C show a drain current (Ids) flowing to a gate signal (VG) and a power switch (M) when an oscillator signal (OSC) is varied. The switch is turned off when the oscillator signal OSC1 and the oscillator signal OSC2 reach the reference voltage (VREF). A feedback voltage (VF) is used as the reference voltage. That is, the power switch is turned on from the time when the oscillator signal (OSC) starts increasing to the time when it reaches the feedback voltage (VF). When the oscillator signal (OSC) is changed from the oscillator signal OSC1 to the oscillator signal OSC2, the gate signal (VG) and the drain current (Ids) are also varied as shown in FIG. 3B and FIG. 3C. FIG. 3B shows a drain current (Ids) flowing to the gate signal (VG) and the power switch (M) according to the oscillator signal OSC1. FIG. 3C shows a drain current flowing to the gate signal (VG) and the power switch (M) according to the oscillator signal OSC2.

When the slope of the modulation control signal is reduced to be ½ in a like manner of the oscillator signal OSC2 as shown in FIG. 3A, the peak value (2Ipk1) of the drain current (Ids) is doubled compared to the peak value (Ipk1) of the drain current (Ids) of FIG. 3B, as shown in FIG. 3C. Since output power is proportional to the square of the peak value of the drain current and the frequency of the power switch, output power in the case of the operation of FIG. 3C is increased to be doubled compared to the case of FIG. 2B. The area with slashes in FIGS. 3B and 3C shows output power. When the output power is increased, the output voltage is increased, and when the output power is decreased, the output voltage is decreased.

Accordingly, when the input voltage is small, the oscillator signal frequency is lowered to lower the power switch's switching operation frequency and increase the output voltage. On the contrary, when the input voltage is high, the frequency of the oscillator signal becomes high to increase the switching operation frequency of the power switch and reduce the output voltage. That is, in order to offset the ripple of the output voltage according to the ripple of the input voltage in the exemplary embodiment of the present invention, the switching frequency is modulated so as to generate an output voltage ripple in the opposite direction to, that of the input voltage ripple.

The second method will be described with reference to FIG. 4A to FIG. 4C. When the current ripple (Ic) is added to the reference current (IR) so as to realize the second method, an increase time of the oscillator signal can be varied according to the modulation control signal (Iosc). While the modulation control signal (Iosc) reaches a predetermined threshold value, the oscillator signal is increased, and the increase period is set to be one period. Since the time for the modulation control signal (Iosc) to increase and reach the predetermined threshold value is reduced as the current ripple (Ic) is increased, one period of the oscillator signal is reduced. On the contrary, as the current ripple (Ic) is reduced, one period of the oscillator signal is increased.

Figure 4A:
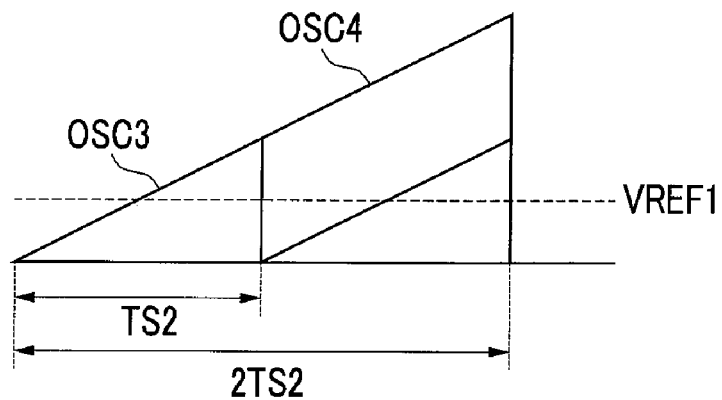
FIG. 4A shows a case in which an increase period of an oscillator signal is doubled to reduce the frequency to be ½ and double the peak value of an oscillator signal.

FIG. 4A shows the case in which a period of an oscillator signal is increased according to the second method to reduce the frequency and increase the peak value of the oscillator signal. FIG. 4B and FIG. 4C show a drain current (Ids) flowing to a gate signal (VG) and a power switch (M) when an oscillator signal (OSC) is varied.

When the input voltage is increased, the oscillator signal OSC3 shown in FIG. 4A is changed to the oscillator signal OSC4. The power switch is turned on from the time when the oscillator signal OSC3 or the oscillator signal OSC4 starts to increase to the time when it reaches the reference voltage (VREF1). It will be assumed in another exemplary embodiment of the present invention that the oscillator signal (OSC) is given in a like manner of FIG. 4A.

Figure 4B:
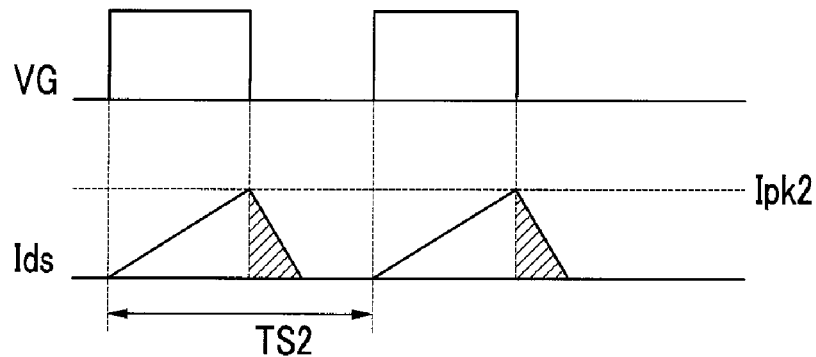
FIG. 4B shows a drain current flowing to a gate signal and a power switch according to an oscillator signal OSC3 shown in FIG. 4A.
Figure 4C:
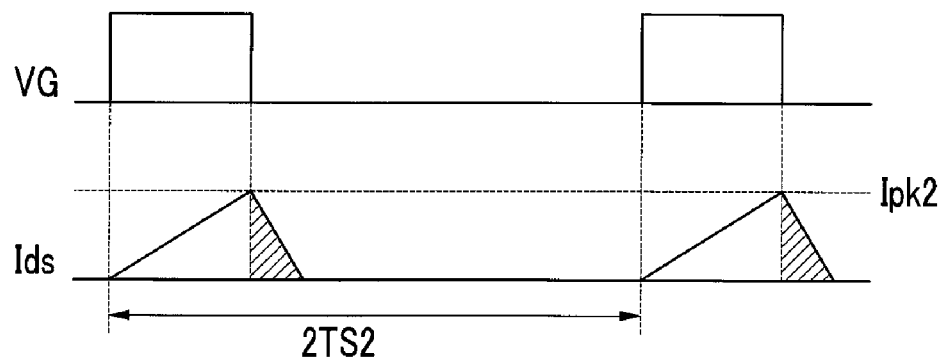
FIG. 4C shows a drain current flowing to a gate signal and a power switch according to an oscillator signal OSC4 shown in FIG. 4A.

When the oscillator signal (OSC) is varied from the oscillator signal OSC3 to the oscillator signal OSC4, the gate signal (VG) and the drain current (Ids) are also varied as shown in FIG. 4B and FIG. 4C. FIG. 4B shows a drain current (Ids) flowing to the gate signal (VG) and power switch (M) according to the oscillator signal OSC3. FIG. 4C shows a drain current flowing to the gate signal (VG) and the power switch (M) according to the oscillator signal OSC4.

In the case of using the second method, when the input voltage is decreased, the input voltage ripple is increased to increase the current ripple (Ic) and then increase the modulation control signal. When the input voltage is increased, the input voltage ripple is reduced to relatively decrease the current ripple (Ic) and then relatively reduce the modulation control signal. As the modulation control signal is decreased, one period of the oscillator signal is increased. When the input voltage is increased, the modulation control signal is reduced to change the oscillator signal from the oscillator signal OSC3 to the oscillator signal OSC4 shown in FIG. 4A. That is, assuming that the input voltage is increased to double the period of the oscillator signal (OSC) and the peak value is increased to be doubled, the switching operation frequency of the power switch is reduced to be ½ and the peak value Ipk2 of the drain current (Ids) is maintained as shown in FIG. 4C. Since the output power is proportional to the square of the peak value of the drain current and the frequency of the power switch, the output power operable as shown in FIG. 4C is reduced to be ½ compared to the case of FIG. 4B. The slashed area of FIG. 4B and FIG. 4C indicates output power. The output voltage is increased when the output power is increased, and the output voltage is reduced when the output power is reduced.

Accordingly, since the oscillator signal frequency is increased when the input voltage is less, the switching operation frequency of the power switch is increased and the output voltage is increased. On the contrary, since the oscillator signal frequency is lowered when the input voltage is high, the switching operation frequency of the power switch is reduced and the output voltage is reduced. The second method modulates the switching frequency so as to generate an output voltage ripple in the opposite direction of the input voltage ripple for the purpose of offsetting the ripple of the output voltage according to the ripple of the input voltage.

The controller 113 will now be described with reference to FIG. 5 to FIG. 7.

Figure 5:
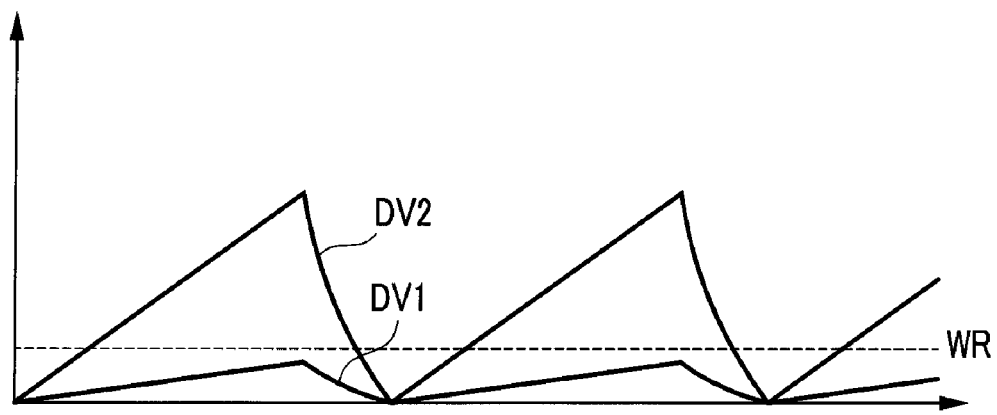
FIG. 5 shows a differential voltage when an input voltage is high or a load is low and a differential voltage when an input voltage is low or a load is high.

FIG. 5 shows a differential voltage DV1 when an input voltage is high or a load is low and a differential voltage DV2 when an input voltage is low or a load is high. As shown in FIG. 5, amplitude of the differential voltage DV1 is relatively less than amplitude of the differential voltage DV2. The differential voltage DV1 of FIG. 5 is set to be less than a reference amplitude (WR).

Figure 6:
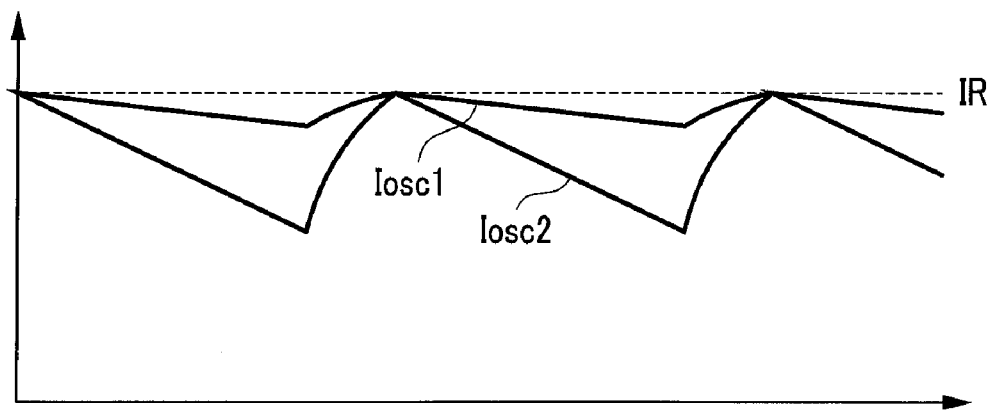
FIG. 6 shows a modulation control signal and another modulation control signal respectively corresponding to a differential voltage and another differential voltage.

FIG. 6 shows a modulation control signal (Iosc1) and a modulation control signal (Iosc2) respectively corresponding to a differential voltage DV1 and a differential voltage DV2.

As shown in FIG. 5 and FIG. 6, when the modulation control signal (Iosc1) is generated by using the differential voltage DV1, width of the frequency modulation is relatively narrow and the EMI cannot be efficiently prevented. The reference amplitude (WR) is set to be the minimum amplitude for preventing EMI, and the controller 113 increases the gain to compensate the differential voltage (DV) to be at least the reference amplitude (WR) when the differential voltage (DV) is less than the reference amplitude (WR).

Figure 7:
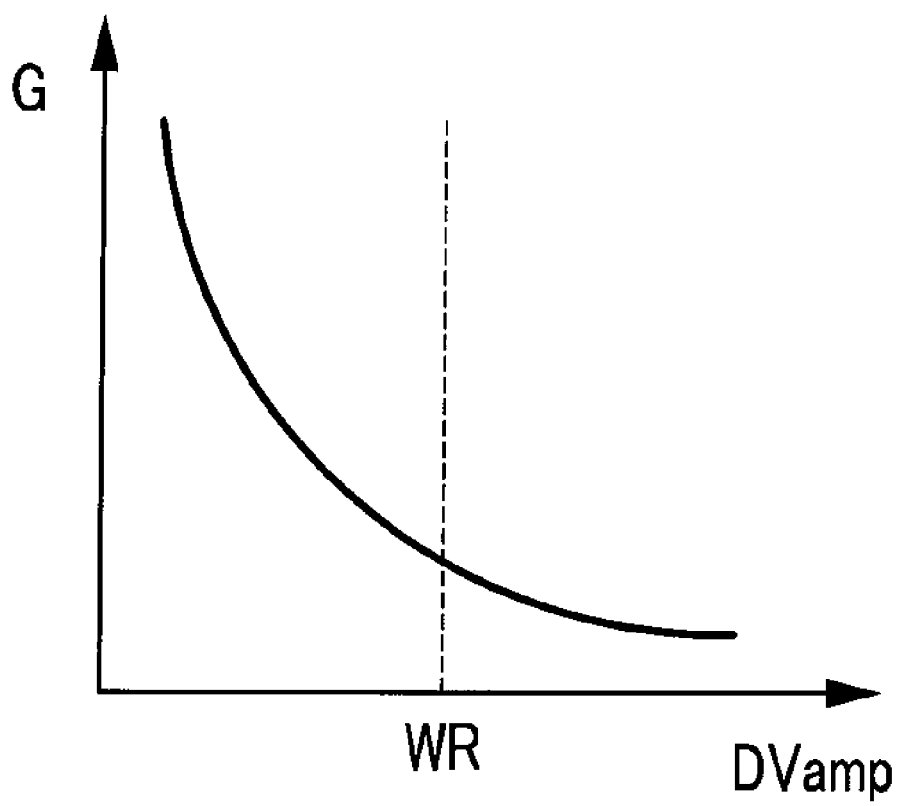
FIG. 7 shows a relationship between amplitude and a gain G of a differential voltage (DV) according to an exemplary embodiment of the present invention.

FIG. 7 shows a relationship between amplitude (DVamp) and gain (G) of a differential voltage according to an exemplary embodiment of the present invention. As shown in FIG. 7, the inversely proportional relationship between the amplitude (DVamp) of the differential voltage and the gain G is set by the controller 113. When the amplitude (DVamp) of the differential voltage is less than the reference amplitude (WR), the gain G is controlled according to the relationship to increase the amplitude (DVamp) of the differential voltage by the degree of the reference amplitude (WR).

It has been described in the exemplary embodiment of the present invention that the differential voltage (DV) is amplified up to the reference amplitude (WR) by controlling the gain G when the amplitude (DVamp) of the differential voltage is less than the reference amplitude (WR), but the present invention is not restricted thereto, and it is possible to control the ripple control signal (RC) to have a constant reference amplitude (WR) by compensating the differential voltage (DV) with the gain G corresponding to the amplitude (DVamp) of the differential voltage according to the relationship shown in FIG. 7.

Referring to FIG. 1 again, the PWM controller 130 will be described.

The PWM controller 130 includes a PWM comparator 133, a feedback voltage generator 134, and the oscillator 135. The PWM controller 130 controls turn-on/off of the power switch (M) by comparing the oscillator signal (OSC) generated by the oscillator 135 and the feedback voltage (VF) corresponding to the feedback information (FB). The switching operation frequency of the power switch (M) corresponds to the frequency of the oscillator signal (OSC). The oscillator 135 generates an oscillator signal (OSC) having a frequency that is variable by the modulation control signal (Iosc). Therefore, the switching operation frequency of the power switch (M) is changed by the ripple of the input voltage.

The feedback voltage generator 134 includes a feedback current source 131 and resistors R1 and R2. The voltage VC1 is a voltage for the feedback current source 131 to generate feedback current (IF). The connecting terminal 3 is connected to a first end of the resistor R1. A second end of the resistor R1 is connected to a first end of the resistor R2 and a non-inverting terminal (+) of the comparator 133, and a second end of the resistor R2 is grounded. The voltage at a node of the resistor R1 and the resistor R2 is the feedback voltage (VF). As the output voltage (Vout) is decreased, the current flowing to the phototransistor (PT) is decreased and the current flowing to the resistor R1 and the resistor R2 is increased to increase the feedback voltage (VF). As the output voltage (Vout) is increased, the current flowing to the phototransistor (PT) is increased and the current flowing to the resistor R1 and the resistor R2 is reduced to decrease the feedback voltage (VF). Accordingly, the feedback voltage (VF) is variable by the output voltage (Vout).

The PWM comparator 133 compares the oscillator signal (OSC) and the feedback voltage (VF) to generate a gate control signal (VGC) for turning off the power switch (M) when the oscillator signal (OSC) becomes greater than the feedback voltage (VF), and generates a gate control signal (VGC) for turning on the power switch (M) when the oscillator signal (OSC) becomes less than the feedback voltage (VF).

The gate driver 140 controls the switching operation by transmitting the gate signal (VG) to the gate electrode of the power switch (M) according to the gate control signal (VGC). The gate driver 140 outputs a low gate signal (VG) for turning off the power switch (M) according to a low gate control signal (VGC), and outputs a high gate signal (VG) for turning on the power switch (M) corresponding to a high gate control signal (VGC).

Figure 8:
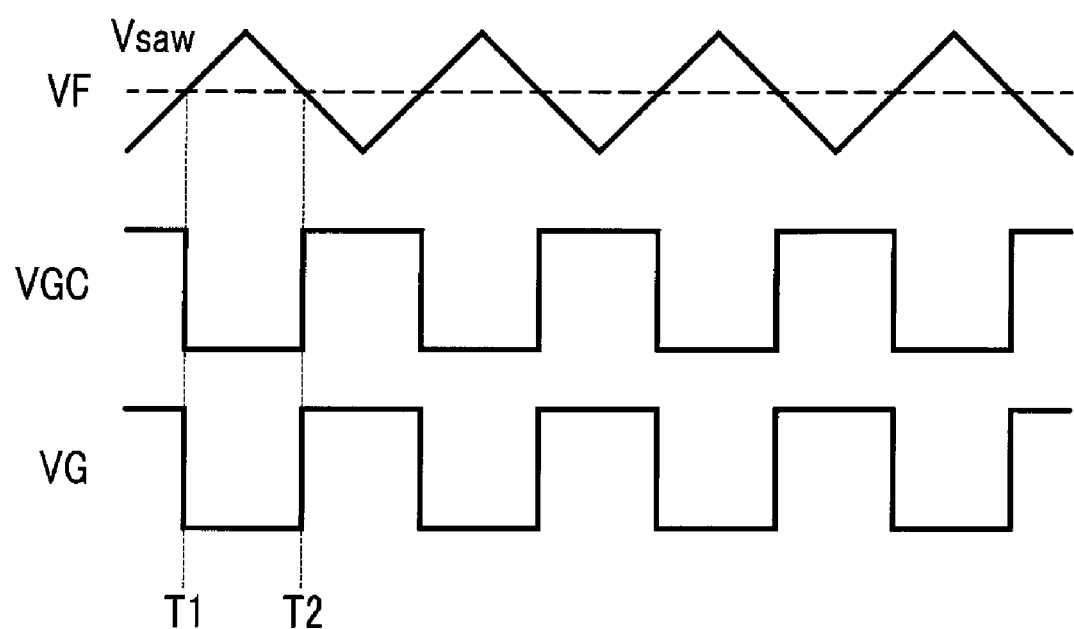
FIG. 8 shows a waveform diagram for describing a switching operation of a power switch according to an exemplary embodiment of the present invention.

FIG. 8 shows a waveform diagram for describing a switching operation of a power switch (M) according to an exemplary embodiment of the present invention.

As shown in FIG. 8, the gate control signal (VGC) becomes low and the gate signal (VG) becomes low at the time T1 when the oscillator signal (OSC) becomes greater than the feedback voltage (VF). Then, the power switch (M) is turned off. The gate control signal (VGC) becomes high and the gate signal (VG) becomes high at the time T2 when the power switch (M) is turned off and the oscillator signal (OSC) becomes less than the feedback voltage (VF). Then, the power switch (M) is turned on. Since the switching operation of the power switch (M) is performed as described above, the frequency of the oscillator signal (OSC) determines the switching operation frequency. Since the frequency of the oscillator signal (OSC) is modulated according to the ripple of the input voltage (Vin), the switching operation frequency of the SMPS is also modulated by the ripple of the input voltage (Vin).

The existing frequency modulation method performs frequency modulation irrespective of the ripple of the input voltage (Vin) so that the ripple of the output voltage generates the ripple component of the output voltage caused by frequency modulation as well as the ripple component of the input voltage (Vin), thereby generating a greater ripple of the output voltage (Vout). However, since the frequency modulation is performed by using the ripple of the input voltage (Vin), the ripple of the input voltage (Vin) and the ripple generated by performing frequency modulation are offset to thereby reduce the ripple of the output voltage.

Therefore, the frequency modulation control device according to the exemplary embodiment of the present invention and the SMPS can reduce EMI and can also reduce the ripple of the output voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A frequency modulation control device for controlling switching operation frequency modulation of a switch mode power supply (SMPS), comprising:
    a peak detector for receiving a sensing voltage corresponding to an input voltage generated by rectifying an input AC voltage of the SMPS, and detecting and maintaining a peak value of the sensing voltage;
    a ripple generator for generating a current ripple that is proportional to a difference between the peak value and the sensing voltage; and
    a modulation control signal generator for generating a modulation control signal by using current generated by subtracting the current ripple from a predetermined reference current.

2. The frequency modulation control device of claim 1, wherein the ripple generator includes:
    a first comparator for generating a differential voltage corresponding to the difference between the peak value and the sensing voltage;
    a controller for selecting a predetermined gain according to the differential voltage, and generating a ripple control signal by multiplying the gain by the differential voltage; and
    a current converter for generating the current ripple according to the ripple control signal.

3. The frequency modulation control device of claim 2, wherein
    the current converter includes:
        a transistor;
        a resistor connected between an emitter electrode of the transistor and ground; and
    a second comparator for controlling a current ripple flowing to the transistor by using the ripple control signal and the resistor.

4. The frequency modulation control device of claim 2, wherein, when an amplitude of the differential voltage is less than a predetermined reference amplitude, the gain is set according to the differential voltage to control an amplitude of the ripple control signal to be a reference amplitude.

5. The frequency modulation control device of claim 2, wherein the gain is set according to the differential voltage so that an amplitude of the ripple control signal may be a predetermined reference amplitude, and the amplitude of the ripple control signal is maintained.

6. The frequency modulation control device of claim 1, wherein the modulation control signal generator includes:
- a reference current source for supplying the reference current;
- a add-drop unit for generating current generated by adding the current ripple to the reference current or dropping the current ripple from the reference current; and
- a dependent current source for receiving the current generated by the add-drop unit, and generating a modulation control signal corresponding to the current.

7. A switch mode power supply (SMPS) comprising:
a power switch;
- a transformer for transmitting power of a primary coil to a secondary coil according to a switching operation of the power switch;
- a feedback circuit connected to the secondary coil of the transformer for generating feedback information corresponding to a voltage at the secondary coil; and
- a switch controller for controlling a switching operation of the power switch by using the feedback information and a ripple of an input voltage transmitted to the primary coil of the transformer, and modulating a switching operation frequency.

8. The SMPS of claim 7, wherein the switch controller includes a frequency modulation control device for comparing a feedback voltage corresponding to the feedback information and an oscillator signal for controlling the switching operation frequency, turning the power switch on or off according to the comparison result, and modulating a frequency of the oscillator signal by using a ripple of the input voltage.

9. The SMPS of claim 8, wherein the frequency modulation control device includes:
- a peak detector for receiving a sensing voltage corresponding to the input voltage, and sensing and maintaining a peak value of the sensing voltage;
- a ripple generator for generating a current ripple that is proportional to a difference between the peak value and the sensing voltage; and
- a modulation control signal generator for generating a modulation control signal by using a current generated by subtracting the current ripple from a predetermined reference current,
wherein the frequency of the oscillator signal is increased or decreased according to the modulation control signal.

10. The SMPS of claim 9, wherein
the ripple generator includes:
- a first comparator for generating a differential voltage corresponding to the difference between the peak value and the sensing voltage;
- a controller for selecting a predetermined gain according to the differential voltage, and generating a ripple control signal by multiplying the differential voltage by the gain; and
- a current converter for generating the current ripple according to the ripple control signal.

11. The SMPS of claim 10, wherein the current converter includes:
a transistor;
- a resistor connected between an emitter electrode of the transistor and ground; and
- a second comparator for controlling a current ripple flowing to the transistor by using the ripple control signal and the resistor.

12. The SMPS of claim 10, wherein
the gain is set according to the differential voltage to control an amplitude of the ripple control signal to be a reference amplitude when an amplitude of the differential voltage is less than a predetermined reference amplitude.

13. The SMPS of claim 10, wherein the gain is set according to the differential voltage to control an amplitude of the ripple control signal to be a predetermined reference amplitude, and the amplitude of the ripple control signal is maintained.

14. The SMPS of claim 9, wherein the modulation control signal generator includes:
- a reference current source for supplying the reference current;
- a add-drop unit for generating current generated by adding the current ripple to the reference current or dropping the current ripple from the reference current; and
- a dependent current source for receiving the generated current from the add-drop unit, and generating a modulation control signal corresponding to the current.

15. A method for modulating a switching operation frequency of a switch mode power supply (SMPS), comprising:
- receiving a sensing voltage corresponding to an input voltage generated by rectifying an input AC voltage of the SMPS, and sensing and maintaining a peak value of the sensing voltage;
- generating a current ripple that is proportional to a difference between the peak value and the sensing voltage;
- generating a modulation control signal by using current generated by dropping the current ripple from a predetermined reference current or adding the current ripple to a predetermined reference current;
- generating an oscillator signal having a frequency that is increased or decreased according to the modulation control signal; and
- controlling a switching operation of a power switch of the SMPS according to the oscillator signal.

16. The method of claim 15, wherein generating the current ripple that is proportional to the difference between the peak value and the sensing voltage includes:
- generating a differential voltage corresponding to the difference between the peak value and the sensing voltage;
- selecting a predetermined gain according to the differential voltage, and generating a ripple control signal by multiplying the differential voltage by the gain; and generating the current ripple according to the ripple control signal.

17. The method of claim 16, wherein the gain is set according to the differential voltage to control an amplitude of the ripple control signal to be a reference amplitude when an amplitude of the differential voltage is less than a predetermined reference amplitude.

18. The method of claim 16, wherein the gain is set according to the differential voltage to control an amplitude of the ripple control signal to be a predetermined reference amplitude, and the amplitude of the ripple control signal is maintained.

* * * * *